United States Patent
Estrada et al.

(10) Patent No.: US 10,002,002 B2
(45) Date of Patent: *Jun. 19, 2018

(54) COMMUNICATION OF DEVICE PRESENCE BETWEEN BOOT ROUTINE AND OPERATING SYSTEM

(71) Applicant: INTEL CORPORATION, Santa Clara, CA (US)

(72) Inventors: David C. Estrada, Beaverton, OR (US); Vincent J. Zimmer, Federal Way, WA (US); Palsamy Sakthikumar, Puyallup, WA (US)

(73) Assignee: INTEL CORPORATION, Santa Clara, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 15/076,384

(22) Filed: Mar. 21, 2016

(65) Prior Publication Data

US 2016/0371098 A1    Dec. 22, 2016

Related U.S. Application Data

(63) Continuation of application No. 13/627,512, filed on Sep. 26, 2012, now Pat. No. 9,292,463.

(51) Int. Cl.
| | |
|---|---|
| *G06F 13/36* | (2006.01) |
| *G06F 9/44* | (2018.01) |
| *G06F 13/40* | (2006.01) |
| *G06F 13/26* | (2006.01) |

(52) U.S. Cl.
CPC .......... *G06F 9/4411* (2013.01); *G06F 9/4406* (2013.01); *G06F 13/26* (2013.01); *G06F 13/4027* (2013.01)

(58) Field of Classification Search
CPC ...... G06F 9/4411; G06F 9/4406; G06F 13/26; G06F 13/4027
USPC .......................................................... 710/312
See application file for complete search history.

(56) References Cited

U.S. PATENT DOCUMENTS

| | | | | |
|---|---|---|---|---|
| 5,185,860 A | * | 2/1993 | Wu | H04L 41/0213 709/224 |
| 5,442,788 A | * | 8/1995 | Bier | G06F 9/542 715/751 |
| 5,802,365 A | * | 9/1998 | Kathail | G06F 13/102 710/10 |

(Continued)

*Primary Examiner* — Paul R Myers

(57) ABSTRACT

Various embodiments are directed to creating multiple device blocks associated with hardware devices, arranging the device blocks in an order indicative of positions of the hardware devices in a hierarchy of buses and bridges, and enabling access to the multiple device blocks from an operating system. An apparatus comprises a processor circuit and storage storing instructions operative on the processor circuit to create a device table comprising multiple device blocks, each device block corresponding to one of multiple hardware devices accessible to the processor circuit, the device blocks arranged in an order indicative of relative positions of the hardware devices in a hierarchy of buses and at least one bridge device; enable access to the device table by an operating system; and execute a second sequence of instructions of the operating system operative on the processor circuit to access the device table. Other embodiments are described and claimed herein.

24 Claims, 10 Drawing Sheets

(56) References Cited

U.S. PATENT DOCUMENTS

| | | | | |
|---|---|---|---|---|
| 5,831,618 A * | 11/1998 | Fuji | G06F 9/4443 | 715/853 |
| 5,844,986 A * | 12/1998 | Davis | G06F 21/572 | 713/187 |
| 5,886,643 A * | 3/1999 | Diebboll | H04L 41/12 | 370/245 |
| 5,960,213 A * | 9/1999 | Wilson | G06F 13/4027 | 710/10 |
| 6,108,702 A * | 8/2000 | Wood | H04L 41/12 | 370/254 |
| 6,154,836 A * | 11/2000 | Dawson, III | G06F 9/4413 | 713/1 |
| 6,249,828 B1 * | 6/2001 | Wallach | G06F 1/20 | 710/302 |
| 6,427,176 B1 * | 7/2002 | Berglund | G06F 11/2247 | 710/104 |
| 6,574,663 B1 * | 6/2003 | Bakshi | H04L 41/12 | 709/220 |
| 6,574,695 B1 * | 6/2003 | Mott | G06F 13/4027 | 710/302 |
| 6,816,963 B1 * | 11/2004 | Krithivas | G06F 9/4416 | 710/10 |
| 6,832,379 B1 * | 12/2004 | Zeryck | G06F 9/4411 | 717/168 |
| 7,107,441 B2 * | 9/2006 | Zimmer | G06F 9/4411 | 713/1 |
| 7,272,644 B1 * | 9/2007 | Kumar | H04L 41/0266 | 709/223 |
| 7,293,184 B2 * | 11/2007 | Zimmer | G06F 1/28 | 713/320 |
| 7,454,547 B1 * | 11/2008 | Nallagatla | G06F 9/4425 | 710/260 |
| 8,122,171 B2 * | 2/2012 | Wetzel | G06F 13/385 | 710/104 |
| 8,266,272 B2 * | 9/2012 | Frietsch | H04L 41/06 | 370/315 |
| 8,301,917 B2 * | 10/2012 | Zmudzinski | G06F 1/3203 | 710/260 |
| 8,543,681 B2 * | 9/2013 | Bearden | H04L 41/0213 | 709/218 |
| 8,595,405 B2 * | 11/2013 | Matthews | G06F 9/4411 | 710/306 |
| 9,292,463 B2 * | 3/2016 | Estrada | G06F 13/4027 | |
| 2002/0023223 A1 * | 2/2002 | Schmidt | B60R 25/24 | 713/187 |
| 2004/0174829 A1 * | 9/2004 | Ayyagari | H04L 45/02 | 370/254 |
| 2004/0255173 A1 * | 12/2004 | Nicholes | G06F 9/4411 | 713/300 |
| 2004/0255306 A1 * | 12/2004 | Nicholes | G06F 9/4411 | 719/321 |
| 2006/0282651 A1 * | 12/2006 | Hobson | G06F 9/4411 | 713/1 |
| 2007/0115967 A1 * | 5/2007 | Vandenberghe | H04L 41/12 | 370/389 |
| 2008/0307213 A1 * | 12/2008 | Sekiguchi | G06F 9/45558 | 713/1 |
| 2009/0204806 A1 * | 8/2009 | Kanemura | G06F 21/10 | 713/155 |
| 2012/0023583 A1 * | 1/2012 | Sallam | G06F 21/564 | 726/24 |

* cited by examiner

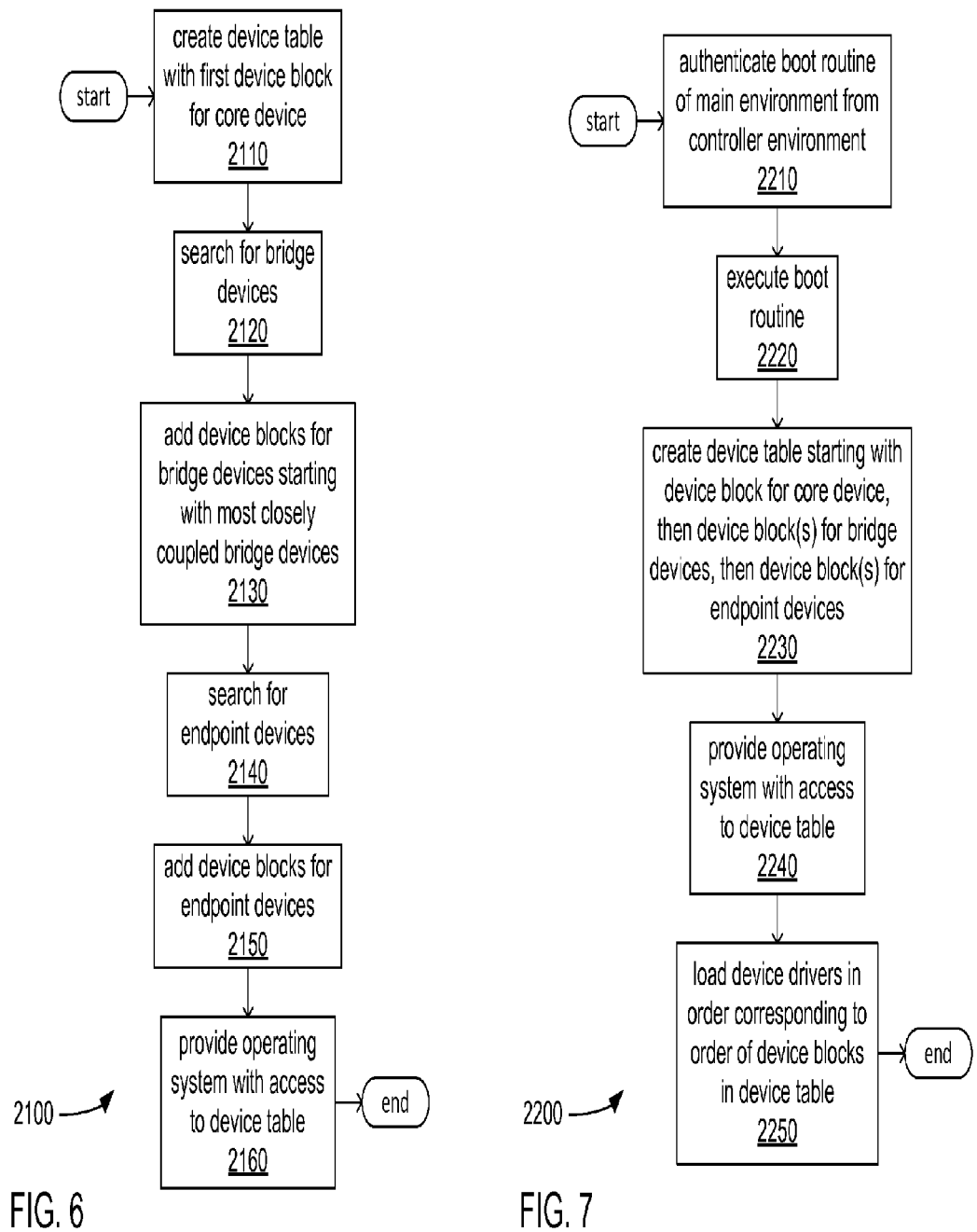

COMMUNICATION OF DEVICE PRESENCE BETWEEN BOOT ROUTINE AND OPERATING SYSTEM

CROSS-REFERENCE TO RELATED APPLICATIONS

This application is a continuation of, claims the benefit of and priority to previously filed U.S. patent application Ser. No. 13/627,512 filed Sep. 26, 2012, entitled "Communication of Device Presence Between Boot Routine and Operating System", the subject matter of which is incorporated herein by reference in its entirety.

BACKGROUND

A substantial number of computing devices have been designed in accordance with a particular processing architecture originating with the IBM® Personal Computer introduced in 1981 (commonly referred to as the industry standard architecture, or ISA). Since that time, ISA has been augmented with numerous enhancements, notable among which is the Peripheral Component Interconnect (PCI) bus (promulgated by the PCI Special Interest Group), which provided a faster bus and added configuration registers providing a register-based protocol for detecting and configuring hardware devices that became a widely accepted part of ISA. However, despite such considerable progress in every technology associated with computing devices, various aspects of ISA remain undesirably in place, such as the I/O mapping of register sets and/or buffers of many hardware components at particular I/O and memory addresses.

As a result, even as memory mapping of register sets and buffers of newer hardware components at reassignable base addresses in both physical and virtual memory spaces have proven to provide numerous benefits, many hardware components are still required to also maintain accessibility to portions of those register sets and/or buffers at specific I/O addresses rigidly specified by ISA (including earlier versions of PCI configuration registers that have since become outdated). Among these hardware components are bus interfaces providing bridges between buses of different signaling, protocol and timing characteristics. Such bridges typically require configuration for use via sets of registers, just as the devices between which the buses and these bridges convey signals.

This strong adherence to the use of particular addresses at which to locate particular pieces of hardware, despite presenting various drawbacks, has long since been relied upon by the writers of both boot software and operating systems. Operating systems executing after boot software have not needed to receive more than minimal data concerning what hardware components are present in a computing system, since the ability to rely on accessing hardware devices at particular addresses specified by ISA (including PCI-styled configuration registers) has enable operating systems to perform their own hardware detection.

However, the growing prominence of processor circuits with no roots in ISA coupled with a desire to finally eliminate at least the more primitive vestiges of ISA has created a developing new situation in which upcoming hardware devices will no longer provide such register sets and/or buffers at such rigidly defined addresses. Instead, these register sets, buffers and/or equivalents thereto will be locatable at conceivably any address range in a virtual memory space. As a result, operating systems will soon require more data from the boot software. It is with respect to these and other considerations that the techniques described herein are needed.

BRIEF DESCRIPTION OF THE DRAWINGS

FIG. 6 illustrates an embodiment of a first logic flow.

FIG. 7 illustrates an embodiment of a second logic flow.

DETAILED DESCRIPTION

Figure 1:
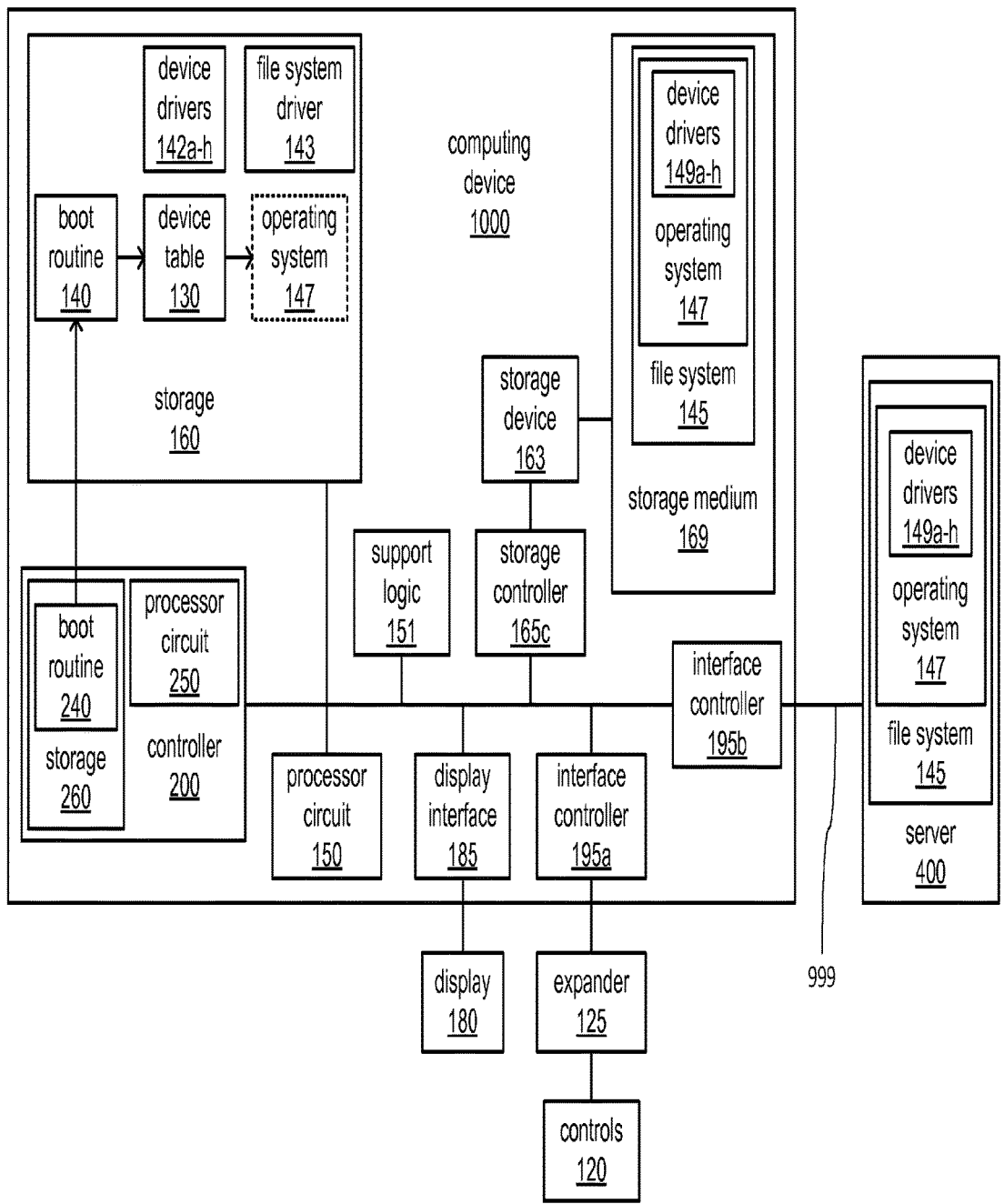
FIG. 1 illustrates a first embodiment of booting a computing device.

Various embodiments are generally directed to a boot routine that creates a multitude of blocks of data and/or executable code that are each associated with a hardware device of a computing device, orders the blocks such that their order communicates relative positions of those hardware devices in a hierarchy of buses and bridges within the computing device, and enables access to the multitude of blocks from an operating system. More specifically, the blocks are arranged by the boot routine in an order that ensures the loading of device drivers for core devices ahead of bridge devices, and ensures the loading of device drivers for bridge devices ahead of endpoint devices for the boot routine and/or later for the operating system.

In a hierarchy of buses and bridge devices in a computing device, an endpoint device (e.g., a non-bridge hardware device) separated from a processor circuit by a bridge device can remain undetected by the processor circuit if there is a bridge device therebetween that is not enabled such that it does not convey the necessary signals between buses that would enable the endpoint device to be detected. Just as is the case with typical endpoint devices, properly enabling the functionality of a bridge device typically requires loading and executing supporting software such as a device driver. Once the device driver for a bridge device is loaded and executed such that the functionality of the bridge device is enabled, then the endpoint device is able to be detected by the processor circuit, thereby providing the necessary indication to the processor circuit of the need to load and execute a device driver for the endpoint device as well.

For a computing device comprising a boot routine that is at least partially compliant with the Advanced Configuration & Power Interface (ACPI) specification promulgated by a group of companies, including Intel Corporation, Microsoft Corporation, Toshiba America, Inc., Hewlett Packard Company, and Phoenix Technologies Ltd., no mechanism is defined in the ACPI specification for that boot routine to indicate positions of hardware components in a hierarchy of buses and bridge devices to an operating system. In the ACPI specification, various tables of information concerning the computing device are created and then a root system description pointer (RSDP) is provided to the operating system to enable the operating system to access those tables to retrieve that information. In particular, the differentiated system description table (DSDT) comprises at least a differentiated definition block (DDB) describing aspects of core hardware components (e.g., a system timer, an interrupt controller, a direct memory access controller, etc.), and may also comprise one or more definition blocks (DBs) that each describe aspects of non-core hardware components. Although the information provided in these tables is considerable, it does not include such hierarchical information.

Unlike older computing devices in which hardware components provided access to at least some of their registers and/or buffers at I/O addresses and physical memory addresses that have remained largely unchanged for over thirty years, hardware components of newer computing devices do not make their registers or buffers available at such addresses. By the time an operating system is loaded, each of the hardware devices has been assigned a range of memory-mapped addresses that are mapped to a virtual memory address space where the virtual memory address space often has little correlation to the physical memory address space that represents the addresses encoded in signals conveyed on the buses to which the hardware devices are coupled. This use of virtual memory addressing is part of a layer of abstraction between the operating system and the hardware components of the computing device that prevents the operating system from detecting at least some hardware components itself.

To augment the functionality of the various tables created by an ACPI compliant boot routine to convey such hierarchical information without modifying any of those tables in a way that would be incompatible with the ACPI specification, an ACPI compliant boot routine creates the DSDT with the DDB and multiple DBs in an order indicative of relative positions of hardware devices in the hierarchy of buses and bridge devices of a computing device. The ordering of the DDB and DBs induces the loading of device drivers by at least an operating system in an order that ensures that device driver(s) supporting the core devices are loaded first, followed by device driver(s) supporting any bridge devices of the computing device, and then followed by device drivers supporting endpoint device(s).

In one embodiment, for example, an apparatus comprises a first processor circuit; and a first storage communicatively coupled to the first processor circuit and arranged to store a first sequence of instructions operative on the first processor circuit to: create a device table comprising multiple device blocks, each device block corresponding to one of multiple hardware devices accessible to the first processor circuit, the device blocks arranged in an order within the device table indicative of relative positions of the hardware devices in a hierarchy of buses and at least one bridge device of the multiple hardware devices; enable access to the device table by an operating system; and execute a second sequence of instructions of the operating system operative on the processor circuit to access the device table. Other embodiments are described and claimed herein.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a computing device 1000 optionally coupled to a server 400. Each of the computing devices 400 and 1000 may be any of a variety of types of computing device, including without limitation, a desktop computer system, a data entry terminal, a laptop computer, a netbook computer, an ultrabook computer, a tablet computer, a handheld personal data assistant, a smartphone, a body-worn computing device incorporated into clothing, a computing device integrated into a vehicle (e.g., a car, a bicycle, a wheelchair, etc.), a server, a cluster of servers, a server farm, etc.

As depicted, the computing devices 400 and 1000 exchange signals conveying an operating system 147 via a network 999 that the computing device 1000 may load and boot, although one or more of these computing devices may engage in exchanges of other data entirely unrelated to the operating system 147. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 1000 comprises one or more of a processor circuit 150, a support logic 151, a storage 160, a storage controller 165c, a storage device 163, a display interface 185, and interface controllers 195a-b. The storage 160 stores one or more of a boot routine 140, device drivers 142a-h, and a file system driver 143. As will be explained, the processor circuit 150, in executing the boot routine 140, creates a device table 130 and stores it in the storage 160, and subsequently loads the operating system 147 into the storage 160. The storage device 163 provides the computing device 1000 with access to the contents of a storage medium 169, where the operating system 147 may be stored and retrieved therefrom. The display interface 185 couples a display 180 to the computing device. The interface controller 195a couples controls 120 to the computing device through an expander 125. The interface controller 195b couples the computing device 1000 to the network 999, and therethrough to the server 400 in which the operating system 147 may be stored and retrieved therefrom. Further, as depicted, the operating system 147 is stored in one or both of the storage medium 169 and a storage of the server 400 in a manner organized according to the specifications of a file system 145, such as FAT (file allocation table), HPFS (high-performance file system), UDF (universal disk format), etc. As also depicted, the operating system 147 comprises device drivers 149a-h.

As depicted, the computing device 1000 may also comprise a controller 200. The controller 200, if present, comprises one or more of a processor circuit 250 and a storage 260 storing a boot routine 240. The controller 200, with the processor circuit 250 and at least the boot routine 240, defines an operating environment of the controller 200 that is intentionally isolated from a main operating environment defined within much of the rest of the computing device 1000 by the processor circuit 150 and at least the boot routine 140. More specifically, the processor circuit 150 is provided with limited or no access to the storage 260 and/or other components of the controller 200, thereby preventing unauthorized access to at least the boot routine 240 (either as stored in the storage 260 or as executed by the processor circuit 250) by the processor 150 under the control of what may be malicious software attempting to alter or subvert tasks performed by the processor circuit 250. In contrast, the processor circuit 250 may have far greater access to hardware and/or software components of the rest of the computing device 1000 beyond the controller 200. As will be explained in greater detail, this enables the operating environment of the controller 200 to be employed in authenticating the boot routine 140, the device table 130 and/or other components in any of a variety of ways.

The computing device 1000 performs a boot process at least in response to electric power being provided to the computing device 1000 (e.g., "powering on" the computing device 1000), if not also in response to a reset operation triggered by software and/or hardware of the computing device 1000 (e.g., a "reset" button or combination of keyboard keys triggering a reset having been pressed, possibly including keys of the controls 120). FIG. 1 depicts aspects of such a boot process.

Where the computing device 1000 is booting (in other words, performing a boot process) in response to the provision of electric power thereto, the processor circuit 250 executes instructions of the boot routine 240, causing the processor circuit 250 to initialize hardware components of at least the controller 200, and possibly other hardware components of the computing device 1000 beyond the controller 200. The processor circuit 250 also accesses the storage 160 to authenticate the boot routine 140 as being an authorized version of the boot routine 140. Presuming that the processor circuit 250 determines that the boot routine 140 is authentic, the processor circuit 250 is caused to transfer control to the boot routine 140, which is executed by the processor 150. However, where the computing device 1000 is booting in response to a reset operation (e.g., receipt of a signal to reset the computing device 1000), an assumption may be made that the boot routine 140 is authentic on the basis that it was previously authenticated by the processor circuit 250 under the control of the boot routine 240 when the computing device 1000 was powered on. Alternatively, authentication during a boot process in response to a reset operation may be treated no different from authentication during a boot process in response to the provision of power, with the boot routine 240 executed by the processor circuit 250 to authenticate the boot routine 140.

Upon commencing to execute the boot routine 140, the processor 150 is caused to perform further initialization tasks, including initializing hardware components of the computing system 1000 beyond the controller 200 to known states. As will be explained in greater detail, the processor 150 is then caused to create the device table 130 from blocks of data and/or executable code that are each associated with a hardware device of the computing device 1000, namely the support logic 151, the storage controller 165c, the storage device 163, the display interface 185, the interface controllers 195a-b, the controls 120, and the expander 125. Where the boot routine 140 is an ACPI compliant boot routine and the device table 130 is a DSDT, the blocks therein comprise a DDB corresponding to the support logic 151 and multiple DBs that each correspond to one of these hardware devices. Further, where the device table 130 is a DSDT, the DDB and each of the DBs comprise a combination of descriptive information about one or more aspects of corresponding ones of these hardware devices, and executable code in the form of compiled AML (ACPI machine language) implementing various routines for controlling the power states of each of these hardware devices. Again, these blocks are arranged within the device table 130 in an order reflecting the relative positions of hardware devices in a hierarchy of buses and bridge devices of the computing device 1000. Amidst creating the device table 130 under the control of the boot routine 140, the processor circuit 150 is also caused to load ones of the device drivers 142a-h that correspond to each of these hardware devices. The device drivers 142a-h are loaded in an order dictated by the order of the blocks making up the device table 130. Given that the device drivers 142a-h are meant to support the performance of a limited range of functions by the boot routine 140, each is likely to provide a relatively limited functionality. Each of the blocks of data and/or executable code may specify aspects of the manner in which each of the device drivers 142a-h interact with its corresponding one of these hardware devices, possibly specifying aspects of a programming interface therebetween, including and not limited to parameters passed, result codes returned, available initialization and/or reset routines, power state control routines, types of I/O and/or memory accesses, mechanisms to determine physical and/or virtual addresses, error conditions, etc. The processor circuit 150 is further caused to load the file system driver 143, then attempt to find a copy of the operating system 147 to load into the storage 160 to execute.

The boot routine 140 may cause the processor circuit 150 to search for a copy of the operating system in various storage devices, possibly starting with storage device(s) within or relatively directly coupled to the computing device 1000 (e.g., the storage device 163 providing access to the storage medium 169) before attempting to reach out across the network 999 to locate a copy of the operating system 147 in a server (e.g., the server 400). Still other orderings of storage devices and/or other forms of storage may be followed in other embodiments. Regardless of where the processor circuit 150 is caused to find a copy of the operating system 147, the processor circuit 150 is caused to load it into the storage 160, and then transfer control to it. In so doing, the processor circuit 150 conveys to a loader of the operating system 147 either an indication of the address location of the device table 130 within the storage 160 or a copy of the device table 130 itself. Where the boot routine 140 is an ACPI compliant boot routine and the device table 130 is a DSDT, then the processor 150 is caused by the boot routine 140 to pass a RSDP to the loader of the operating system 147. The RSDP points to the address location of the root system description table (RSDT), which in turn comprises a pointer to a fixed ACPI description table (FACP), which in turn comprises a pointer to the DSDT (i.e., the device table 130). Regardless of the exact manner in which the operating system 147 is provided access to the device table 130, the operating system 147 parses the blocks of the device table 130, and loads the device drivers 149a-h in an order that follows the order of the blocks of the device table 130 (substantially mirroring the order in which the device drivers 142a-h were loaded). In comparison to the device drivers 142a-h, the device drivers 149a-h are likely to support a greater range of functionality.

In various embodiments, each of the processor circuits 150 and 250 may comprise any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5C), Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked.

In various embodiments, each of the storages 160 and 260, as well as the combination of the storage device 163 and the storage medium 169, may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interface controllers 195a-b, as well as the storage controller 165c, may employ any of a wide variety of signaling technologies enabling the computing device 1000 to be coupled through the network 999 and/or various hardware devices as has been described. Each of these interfaces comprises circuitry providing at least some of the requisite functionality to enable such coupling. However, these interfaces may also be at least partially implemented with sequences of instructions executed by the processor circuits 150 and/or 250 (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

In various embodiments, the controls 120 (accessible via the interface controller 195a and the expander 125) may comprise any of a variety of types of manually-operable controls, including without limitation, lever, rocker, push-button or other types of switches; rotary, sliding or other types of variable controls; touch sensors, proximity sensors, heat sensors or bioelectric sensors, etc. These controls may comprise manually-operable controls disposed upon a casing of the computing device 1000, and/or may comprise manually-operable controls disposed on a separate casing of a physically separate component of the computing device 1000 (e.g., a remote control coupled to other components via infrared signaling). Alternatively or additionally, these controls may comprise any of a variety of non-tactile user input components, including without limitation, a microphone by which sounds may be detected to enable recognition of a verbal command; a camera through which a face or facial expression may be recognized; an accelerometer by which direction, speed, force, acceleration and/or other characteristics of movement may be detected to enable recognition of a gesture; etc.

In various embodiments, the display 180 (accessible via the display interface 185) may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, etc. Each of these displays may be disposed on a casing of corresponding ones of the computing device 1000, or may be disposed on a separate casing of a physically separate component of the computing device 1000 (e.g., a flat panel monitor coupled to other components via cabling).

Figure 2A:
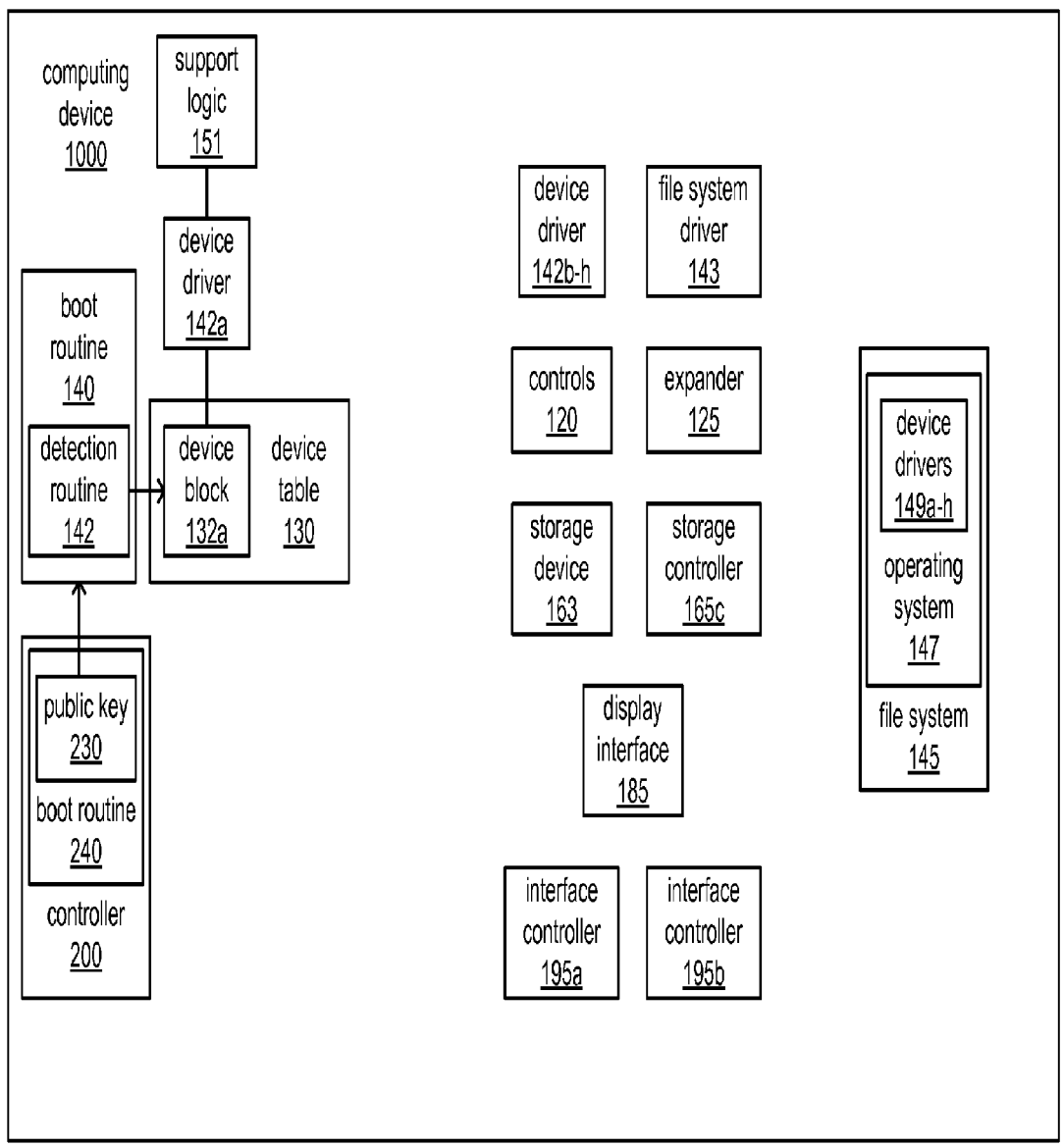
FIGS. 2*a-c* each illustrate a portion of the embodiment of FIG. 1.
Figure 2B:
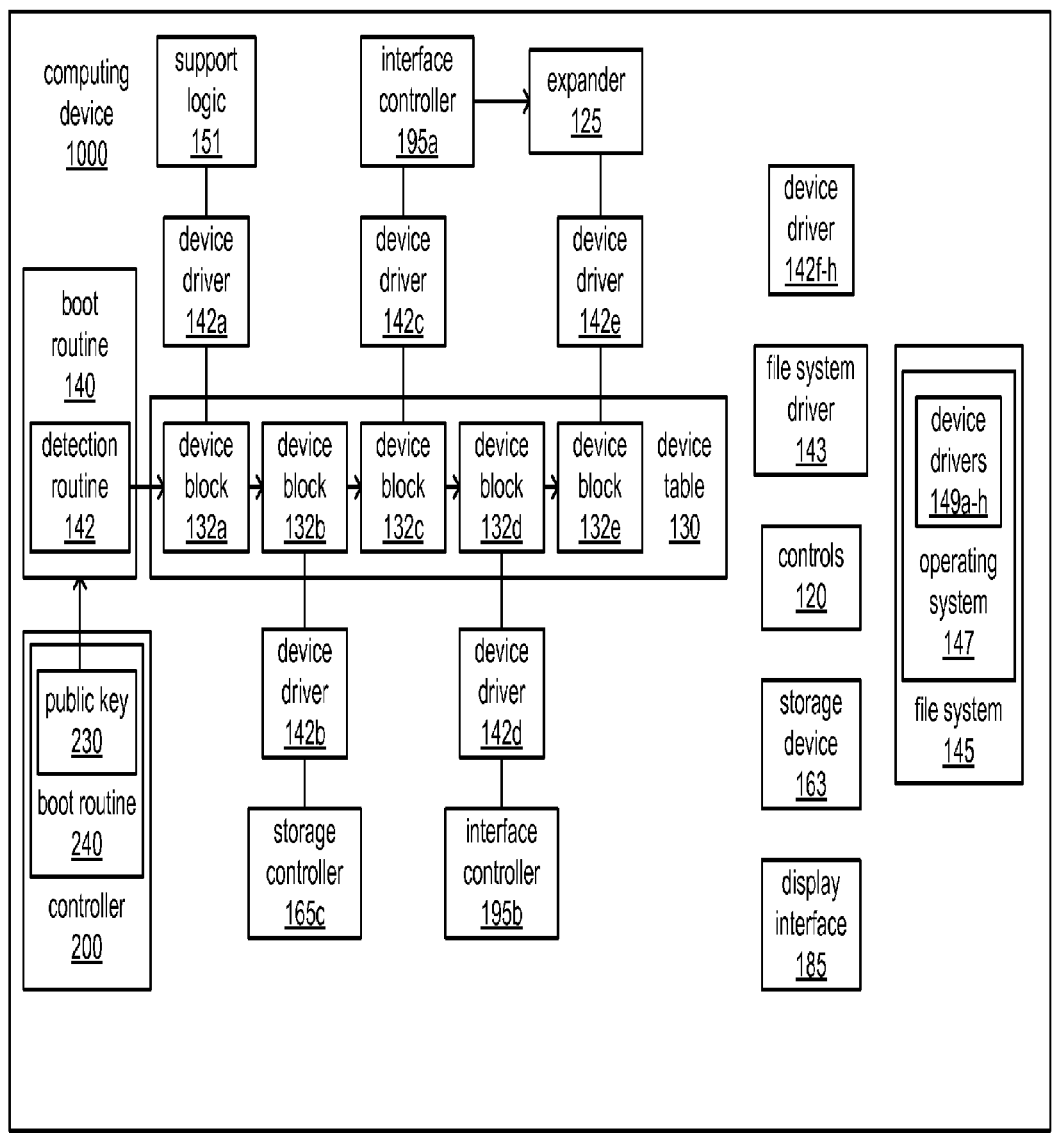
Figure 2C:
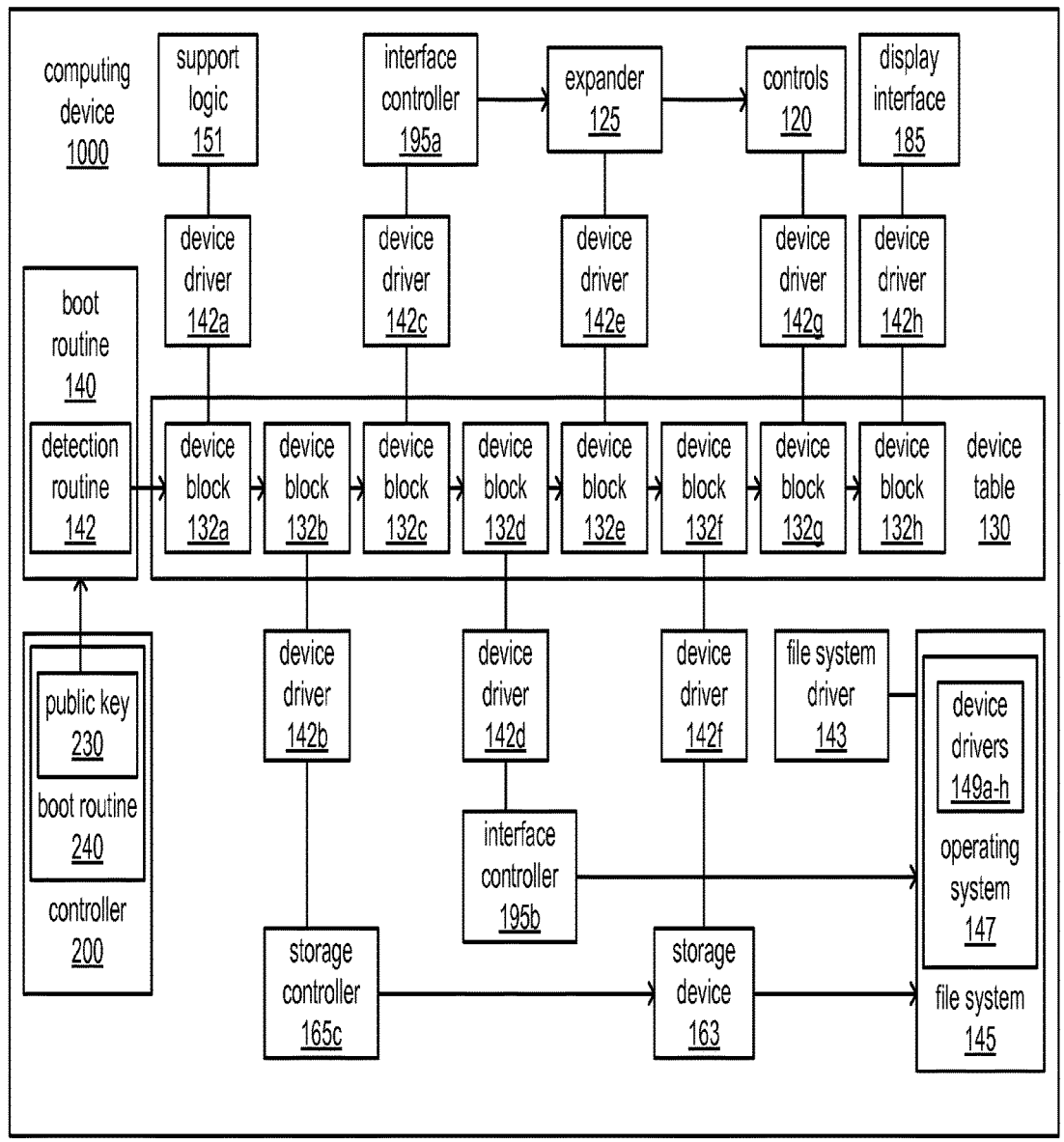

FIGS. 2a, 2b and 2c each depict the same portion of the computing device 1000 in greater detail, at different stages of the creation of the device table 130 by the processor circuit 150 (see FIG. 1) under the control of the boot routine 140. Also depicted is the use of a public-key-private-key system by the processor circuit 250 (see FIG. 1) under the control of the boot routine 240 to authenticate the boot routine 140.

In various embodiments, the boot routine 240 comprises a public key 230 that may be embedded within the boot routine 240 as depicted, or may be stored elsewhere within the storage 260 of the controller 200. In various embodiments, the boot routine 140 comprises a detection routine 142. The boot routine 140 may be digitally signed with a private key issued by a certification authority that also issued the public key 230. As has been described, following powering up and/or a resetting of the computing device 1000, the processor circuit 250 may be caused to retrieve and authenticate the signature of the boot routine 140. In so doing, the processor circuit 250 may be caused by the boot routine 240 to access the storage 160 to read the boot routine 140 to retrieve its signature, and then authenticate that signature using the public key 230. If that signature is authenticated, then the boot routine 140 is deemed as accepted for being executed, and the processor circuit 150 is caused to proceed with executing it.

Regardless of whether execution of the boot routine 140 by the processor circuit 150 is preceded by authentication of the boot routine 140, or not, the processor circuit 150 is caused to execute the detection routine 142 of the boot routine 140, and is thereby caused to create the device table 130. As has been discussed, the device table 130 is formed from multiple blocks comprising data and/or executable code, e.g., the device blocks 132a-h depicted as growing in number within the device table 130 through FIGS. 2a-c. As has also been discussed, each of the device blocks 132a-h is associated with a hardware device, namely the support logic 151, the storage controller 165c, the storage device 163, the display interface 185, the interface controllers 195a-b, the controls 120, and the expander 125. Further, as has been discussed, the order of the device blocks 132a-h is such that core devices precede bridge devices, which in turn, precede endpoint devices.

Therefore, starting with FIG. 2a, the processor circuit 150 is caused by the detection routine 142 to create the device table 130 with a first device block 132a, which corresponds to the device driver 142a, which in turn, corresponds to the support logic 151. The support logic 151 is a hardware device comprising various devices providing a core of basic hardware support functions to support the performance of basic operations by the processor circuit 150 as part of the computing device 1000, including and not limited to, system timer(s), a real-time clock (RTC), an interrupt controller, direct memory access (DMA) controller, cache controller, temperature and/or supply voltage monitors, variable processor clock speed controller, etc. It is this very basic nature of the support it provides to the processor circuit 150 that causes the support logic 151 to be given the device block 132a at the starting position of the order of the device blocks 132a-h that are to follow. Where the boot routine 140 is an ACPI compliant boot routine and the device table 130 is a DSDT, the device block 132a would be the DDB.

In various embodiments, the processor circuit 150 may be caused by the detection routine 142 to search for the support logic 151, possibly by searching a limited number of selected address locations at which one or more registers of the support logic 151 may be accessible. Alternatively, the presence of the support logic 151 may be assumed in the manner in which the instructions of the detection routine 142 are written such that the processor circuit 150 is caused to simply proceed with creating the device table 130 with the device block 132a as the first entry without a search to locate and/or confirm the presence of the support logic 151.

As a result of the device table 130 being thusly formed with the device block 132a, the processor circuit 150 is caused by the boot routine 140 to locate the device driver 142a within the storage 160, load it and execute it. In so doing, the processor circuit 150 is caused to initialize various portions of the support logic 151 to prepare its various hardware support functions for use, and various routines for accessing and controller those hardware support functions are made available to be called by other portions of software.

Turning to FIG. 2b, the processor circuit 150 is caused by the detection routine 142 to add device blocks 132b-e to the device table 130, corresponding to the device drivers 142b-e, which in turn, correspond to the storage controller 165c, the interface controller 195a, the interface controller 195b and the expander 125, respectively. The storage controller 165c, the interface controllers 195a and 195b, and the expander 125 are all hardware devices sharing the common characteristic of being bridge devices. In other words, each of these hardware devices couples to and bridges between two buses such that each may be interposed between the processor circuit 150 and one or more other hardware devices (either endpoint devices or other bridge devices) coupled to a bus other than a bus to which the processor circuit 150 is more directly coupled.

As previously explained, it is possible for a bridge device that has not been enabled to render another hardware device inaccessible such that the hardware device is not detectable by a processor circuit. Therefore, to ensure the successful detection of and installation of device drivers for all hardware devices, the processor circuit 150 is caused by the detection routine 142 to search for bridge devices before searching for endpoint devices, thereby resulting in the device blocks 132b-e corresponding to bridge devices following immediately after the device block 132a corresponding to a core device. As those skilled in the art will readily recognize, many of the specifications for many of the various buses commonly employed in computing devices have well-defined mechanisms for locating bridge devices (e.g., register sets with bits indicating their presence at specific addresses, specific signal protocols indicating their presence, etc.). The processor circuit 150 may be caused to employ such well-defined mechanisms to locate each of the storage controller 165c, the interface controllers 195a-b and/or the expander 125. Alternatively or additionally, the presence of one or more of these bridge devices may be assumed to be present in the manner in which the instructions of the detection routine 142 are written such that the processor circuit 150 is caused to simply proceed with adding one or more of the device blocks 132*b*-*e* to the device table 130 without a search to locate and/or confirm their presence.

A review of the relative positions of the device blocks 132*c* and 132*e* in the ordering of these device blocks within the device table 130 reveals a feature of this ordering. Referring briefly to FIG. 1, it can be seen that the interface controller 195*a* is a bridge device that is interposed, between the processor circuit 150 and the expander 125 such that the processor circuit 150 can only detect and interact with the expander 125 through the interface controller 195*a*. Therefore, if the interface controller 195*a* is not enabled for use, the expander 125 may be inaccessible to the processor circuit 150 such that it would be undetectable by the processor circuit 150.

In response to this possibility of not detecting a bridge device that may be "hidden" from the processor circuit 150 by another bridge device, the processor circuit 150 is caused by the detection routine 142 to conduct its search for bridge devices starting with bridge devices that are more closely coupled to the processor circuit 150 in the hierarchy of buses and bridge devices within the computing device 1000 first, and to add device blocks to the device table 130 corresponding to those more closely coupled bridge devices before searching for bridge devices that are more remotely coupled to the processor circuit 150. Thus, the device blocks 132*b*-*d* associated with the storage controller 165*c* and the interface controllers 195*a*-*b*, which are relatively directly coupled to the processor circuit 150, are added to the device table 130 at the positions in the ordering of device blocks that immediately follow the device block 132*a* corresponding to a core device (i.e., the support logic 151). Further, the processor circuit 150 is caused to load and execute the device drivers 142*b*-*d* associated with these more closely coupled bridge devices, resulting in their being enabled for use.

With these more closely coupled bridge devices enabled, the processor circuit 150 is then caused to again search for bridge devices, however, the processor circuit 150 is now caused to search for bridge devices that must be accessed by the processor circuit 150 through these more closely coupled bridge devices (e.g., bridge devices that are less closely coupled to the processor circuit 150). In so doing, the processor circuit 150 is caused to detect the expander 125 through the now-enabled interface controller 195*a*. This, in turn, causes the processor circuit 150 to add the device block 132*e* corresponding to the expander 125 to the device table 130, and to do so at a position in the ordering of these device blocks that follows the position of the device block 132*c* corresponding to the interface controller 195*a*. Further, the processor circuit 150 is caused to load and execute the device driver 142*e* associated with the expander 125, resulting in its being enabled for use. Stated differently, the device blocks 132*c* and 132*e* are arranged relative to each other in the order of device blocks within the device table 130 in an order of decreasing closeness of coupling to the processor circuit 150 that reflects the fact of the interface controller 195*a* being closely coupled to the processor circuit 150 since the expander 125 must be accessed by the processor circuit 150 through the interface controller 195*a*.

Turning to FIG. 2*c*, the processor circuit 150 is caused by the detection routine 142 to add device blocks 132*f*-*h* to the device table 130, corresponding to the device drivers 142*f*-*h*, which in turn, correspond to the storage device 163, the controls 120 and the display interface 185, respectively. The storage device 163, the controls 120 and the display interface 185 are all hardware devices sharing the common characteristic of being endpoint devices. In other words, each of these hardware devices couples to only one bus, and thusly does not serve as a bridge to any other bus.

Following the detection of, the addition of device blocks in the device table 130 for, and the loading and execution of device drivers for core device(s) and all bridge devices, the processor circuit 150 is caused by the detection routine 142 to search for endpoint devices. This search results in the processor circuit 150 detecting the storage device 163, the controls 120 and the display interface 185, and adding corresponding ones of the device blocks 132-*fh* to the device table 130. The processor circuit 150 is further caused to load and execute the device drivers 142*f*-*h*, thereby enabling each of these three endpoint devices. Given what hardware devices are depicted in FIG. 1 as being present, the addition of these last three device blocks 132*f*-*h* to the device table 130 completes the device table.

Following completion of the device table 130 and attendant completion of loading and executing of the device drivers 142*a*-*h* in an order corresponding to the order of the device blocks 132*a*-*h* such that all of the corresponding hardware devices are enabled, the processor circuit 150 is caused to load and execute the file system driver 143 in preparation for retrieving the operating system 147 from a storage device in which the operating system 147 will have been stored in a manner dictated by aspects of a particular file system supported by the operating system 147. As previously discussed, the processor circuit 150 is then caused to search for a storage device having a copy of the operating system 147 stored thereon.

Figure 3:
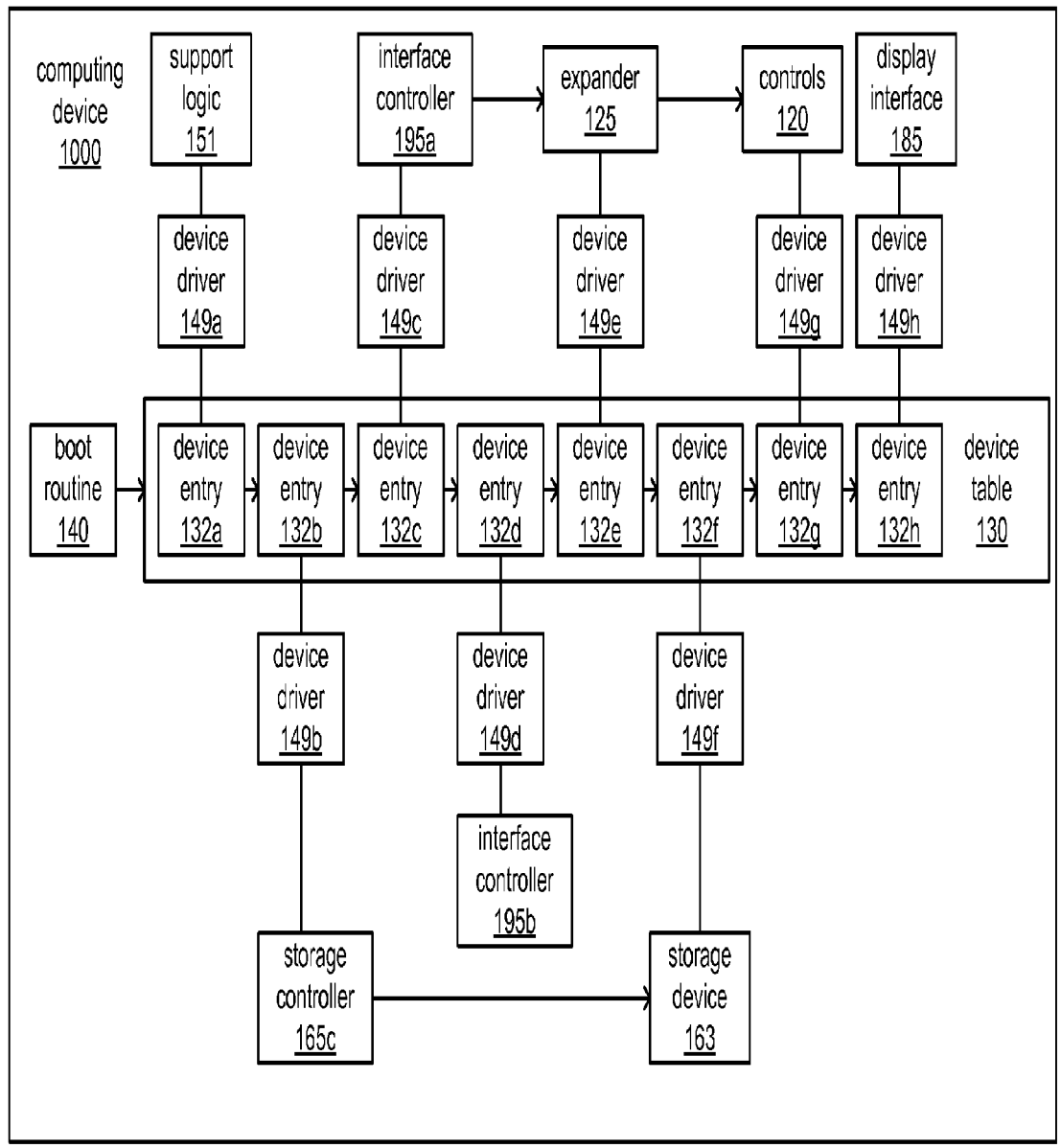
FIG. 3 illustrates a portion of the embodiment of FIG. 1.

FIG. 3 depicts another portion of the computing device 1000 in greater detail, including aspects of the loading of the device drivers 149*a*-*h* by the processor circuit 150 under the control of a loader of the operating system 147, and guided by the ordering of the device blocks 132*a*-*h* within the table 130.

As previously discussed, with the processor circuit 150 having been caused by the boot routine 140 to locate a copy of the operating system 147, the processor circuit 150 is caused to load the operating system 147 into the storage 160, to provide the operating system 147 with access to the device table 130, and to then transfer control to the operating system 147 to enable the operating system 147 to commence booting. Amidst booting, the operating system 147 accesses the device table 130 to obtain indications of what hardware devices are present within the computer system 1000, namely the support logic 151, the storage controller 165*c*, the storage device 163, the display interface 185, the interface controllers 195*a*-*b*, the controls 120, and the expander 125. Upon accessing the device table 130, the processor 150 is caused by the operating system 147 to commence loading the device drivers 149*a*-*h* for these hardware devices in an order that corresponds to the order in which the device blocks 132*a*-*h* for corresponding ones of these hardware devices are arranged within the device table 130. As a result, the device drivers 149*a*-*h* are loaded in an order that mirrors the order in which the device drivers 142*a*-*h* were earlier loaded for corresponding ones of these hardware devices.

In this way, the operating system 147 is influenced by the order of the device blocks 132*a*-*h* to load the device drivers 149*a*-*h* in an operable order. In essence, the operating system 147 is provided with guidance concerning a hierarchy of buses and bridge devices complete enough to employ in loading device drivers, this guidance being implicitly provided through the ordering of the device blocks 132*a*-*h*. This results in an efficient loading of the device drivers 149*a*-*h* in which the device driver for a given hardware device is loaded only after the device drivers for other hardware devices between it and the processor circuit 150 being loaded such that those other hardware devices are fully configured for access and use by the operating system 147, thereby ensuring effective configuration of all of these hardware devices for access and use by the operating system 147.

Figure 4:
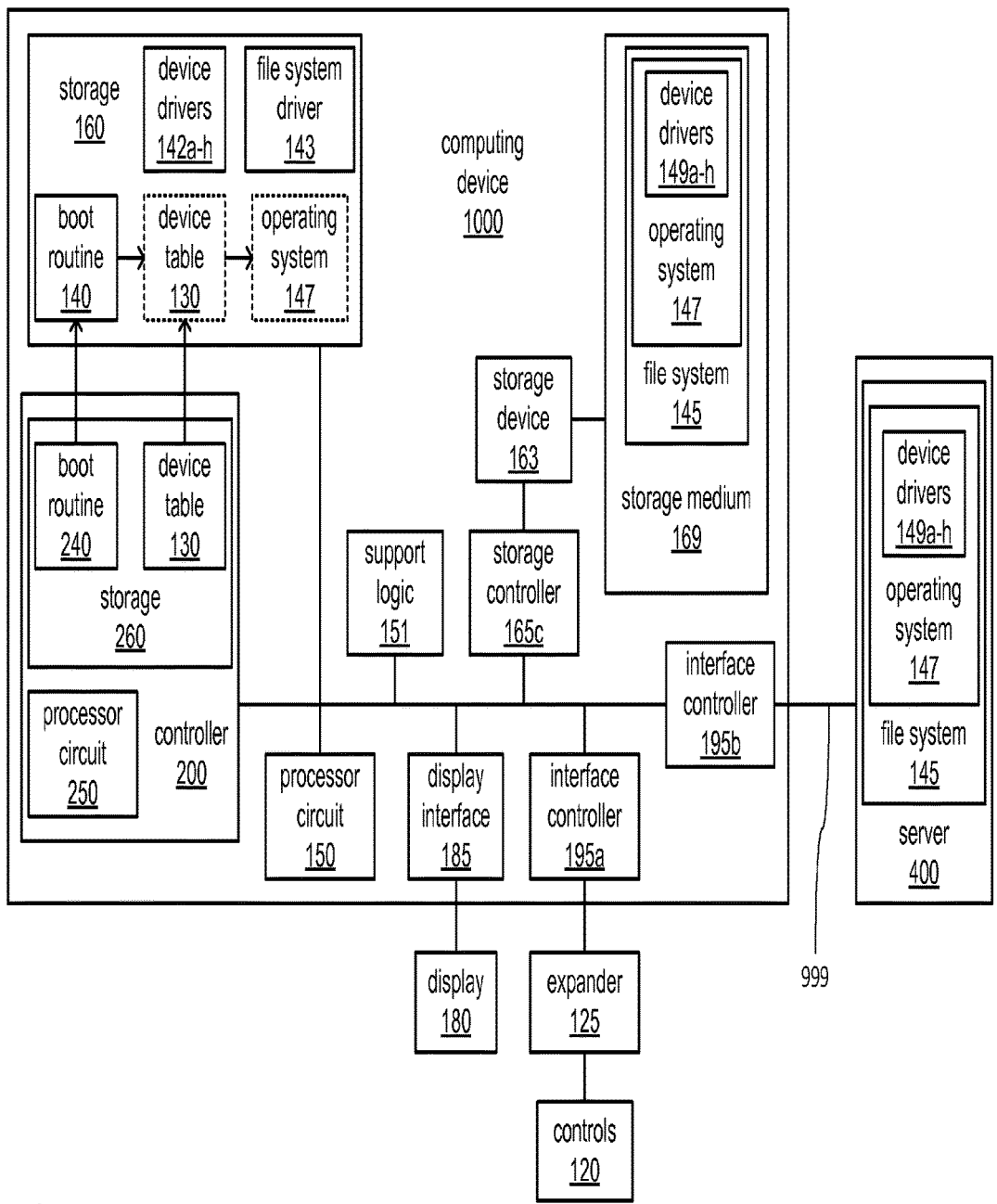
FIG. 4 illustrates a second embodiment of booting a computing device.

FIG. 4 illustrates a block diagram of a variation of the computing device 1000 of FIG. 1. This variation depicted in FIG. 4 is similar to what is depicted in FIG. 1 in many ways, and thus, like reference numerals are used to refer to like elements throughout. However, unlike the variant of the computing device 1000 of FIG. 1, in the variant of the computing device 1000 of FIG. 4, the device table 130 is stored in the storage 260 of the controller 200, from which it is copied into the storage 160 by the processor circuit 250 under the control of the boot routine 240. In this way, there is greater assurance of the integrity of the device table 130 against the possibility of it being manipulated by malicious software to possibly employ it as a vehicle to add malicious software masquerading as a device driver corresponding to a device block added to the device table 130 for a fictitious hardware device.

The device blocks within the device table 130 may, as stored in the storage 260, be arranged in the manner previously described such that their order within the device table 130 implicitly indicates relative positions of hardware devices in the hierarchy of buses and bridge devices of the computing device 1000.

The processor circuit 150 may be caused to not engage in any search for any hardware devices within the computer system 1000, and the device table 130 may be made accessible to the operating system 147 unchanged from having been copied into the storage 160 by the processor circuit 250. To accommodate the uncertainty of the presence of hardware devices that may be coupled to the computing device 1000 in a manner that permits their being uncoupled, the device table 130 may be created and stored in the storage 260 with device blocks for all of the hardware devices that may or may not be so coupled, and that are desired to be supported when so coupled.

Alternatively, the processor circuit 150 may be caused to engage in a search for any hardware devices beyond those for which device blocks are provided in the device table 130 as it is stored in the storage 260 and copied into the storage 160. It may be that such a search for such additional hardware devices is limited to locating only endpoint devices such that device blocks for additional devices may be added following the device blocks already in the device table 130 such that the device blocks for any additional devices are always last in the ordering of device blocks. Such a limit to add only endpoint devices would preclude the need to insert device blocks among the device blocks already present in the device table 130 to correctly reflect the position of a newly found bridge device relative to the other hardware devices in the hierarchy of buses and bridge devices of the computing device 1000.

As a further possibility, where the boot routine 140 is an ACPI compliant boot routine, where the device table 130 is a DSDT, and where a search for new hardware devices is limited to locating only endpoint devices, an SSDT (secondary system descriptor table) with a single corresponding device block (i.e., a single DB) may be created for each new hardware device. Pointers for each SSDT thusly created may be added to the RSDT or other appropriate ACPI table. In this way, the integrity of the device table 130 (i.e., the DSDT) as stored in the storage 260 and copied to the storage 160 would be maintained.

Figure 5:
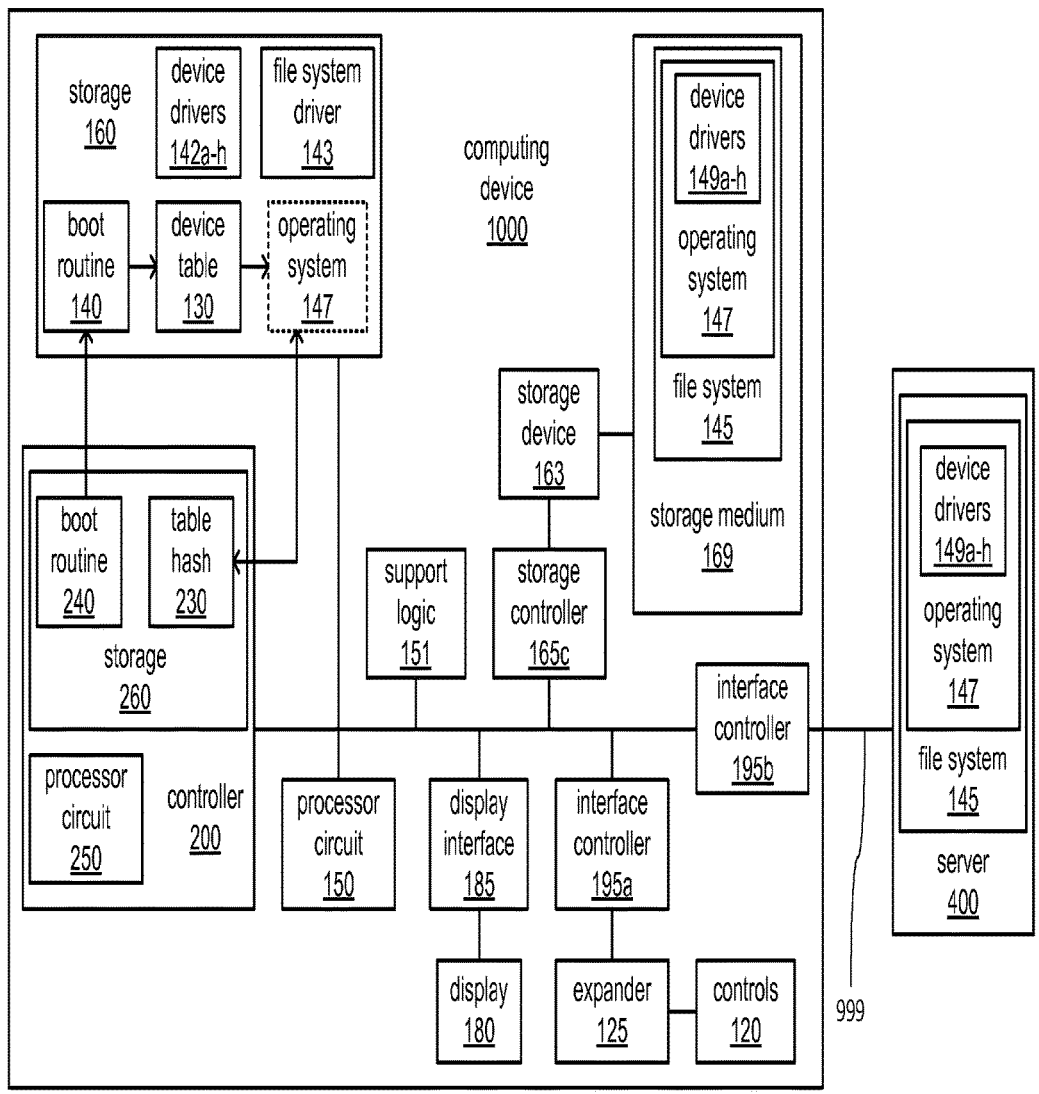
FIG. 5 illustrates a third embodiment of booting a computing device.

FIG. 5 illustrates a block diagram of another variation of the computing device 1000 of FIG. 1. This variation depicted in FIG. 5 is similar to what is depicted in FIG. 1 in many ways, and thus, like reference numerals are used to refer to like elements throughout. However, unlike the variant of the computing device 1000 of FIG. 1, in the variant of the computing device 1000 of FIG. 4, the device table 130 is stored in the storage 160 (possibly copied from the storage 260) and is not modified by the processor circuit 150 in executing the boot routine 140. Thus, the device table 130 is made accessible to the operating system 147 without modification. Further, a hash of the device table 130 is stored in the storage 260 as a table hash 230. Upon gaining access to the device table 130, the operating system 147 may signal the controller 200 to provide the table hash 230 to the operating system 147 to enable the operating system 147 to use the hash to check the integrity of the device table 130 to which it has been given access.

FIG. 6 illustrates an embodiment of a logic flow 2100. The logic flow 2100 may be representative of some or all of the operations executed by one or more embodiments described herein. More specifically, the logic flow 2100 may illustrate operations performed by at least the processor circuit 150 of the computing device 1000 in executing at least the boot routine 140.

At 2110, a processor circuit of a computing device (e.g., the processor circuit 150 of the computing device 1000) creates a device table (e.g., the device table 130) with a first device block corresponding to a core device of the computing device (e.g., support logic incorporating a DMA controller, an interrupt controller, a real-time clock, system timer(s), cache controller, etc.).

At 2120, the processor circuit searches for bridge devices among its hardware devices.

At 2130, the processor circuit adds device blocks to the device table (immediately following the device block for the core device) for bridge devices, starting with device blocks corresponding to bridge device(s) that are most closely coupled to the processor circuit, followed by device blocks for bridge device(s) that are increasingly more remotely coupled to the processor circuit.

At 2140, the processor circuit searches for endpoint devices among its hardware devices.

At 2150, the processor circuit adds device blocks to the device table for endpoint device(s), immediately following the device block(s) for bridge devices.

At 2160, the processor circuit makes the device table accessible to an operating system that the processor circuit is booting (e.g., the operating system 147).

FIG. 7 illustrates an embodiment of a logic flow 2200. The logic flow 2200 may be representative of some or all of the operations executed by one or more embodiments described herein. More specifically, the logic flow 2200 may illustrate operations performed by one or both of the processor circuits 150 and 250 of the computing device 1000 in executing at least the boot routines 140 and 240, respectively.

At 2210, a processor circuit of a controller (e.g., the processor circuit 250 of the controller 200) in a controller operating environment isolated from a main operating environment of a computing device (e.g., the computing device 1000) authenticates a boot routine (e.g., the boot routine 140) to be executed by a processor circuit of the main operating environment (e.g., the processor circuit 100).

At 2220, the processor circuit of the main operating environment executes the boot routine following its authentication.

At 2230, the processor circuit creates a device table (e.g., the device table 130) comprising device blocks arranged into an order that starts with a device block for a core device, followed by device blocks for bridges devices in an order of decreasing closeness of coupling to the processor circuit, and then followed by device blocks for endpoint devices.

At 2240, the processor circuit makes the device table accessible to an operating system that the processor circuit is about to pass control to in order to boot (e.g., the operating system 147).

At 2250, while executing the operation system (possibly its loader) the processor circuit loads device drivers in an order that follows the order of the device blocks in the device table for corresponding hardware devices (e.g., the device drivers 149a-h).

Figure 8:
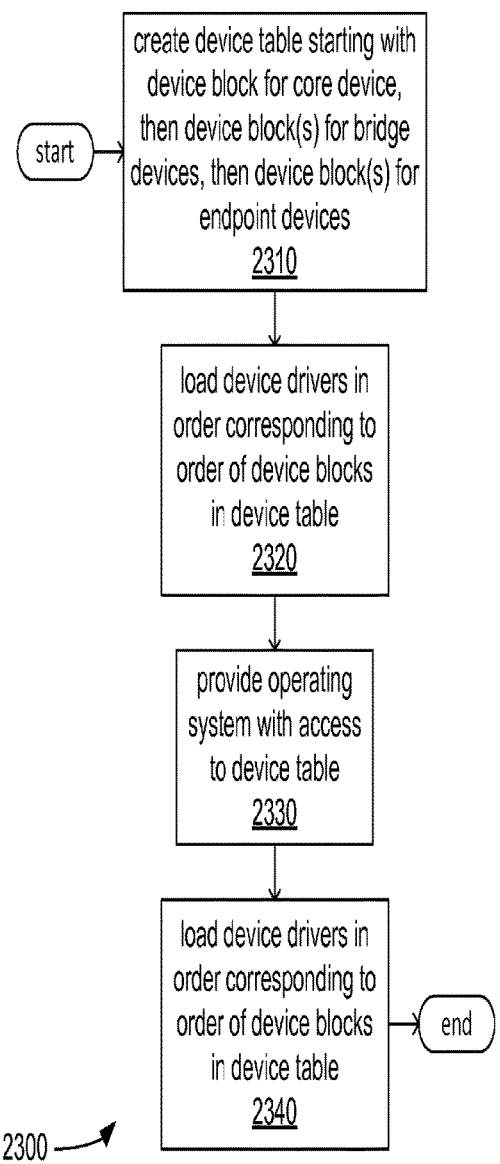
FIG. 8 illustrates an embodiment of a third logic flow.

FIG. 8 illustrates an embodiment of a logic flow 2300. The logic flow 2300 may be representative of some or all of the operations executed by one or more embodiments described herein. More specifically, the logic flow 2300 may illustrate operations performed by at least the processor circuit 150 of the computing device 1000 in executing at least the boot routine 140.

At 2310, the processor circuit of a computing device (e.g., the processor circuit 150 of the computing device 1000) creates a device table (e.g., the device table 130) comprising device blocks arranged into an order that starts with a device block for a core device, followed by device blocks for bridges devices arranged in an order of decreasing closeness of coupling to the processor circuit, and then followed by device blocks for endpoint devices.

At 2320, while executing a boot routine (e.g., the boot routine 140), the processor circuit loads device drivers in an order that follows the order of the device blocks in the device table for corresponding hardware devices (e.g., the device drivers 142a-h).

At 2330, the processor circuit makes the device table accessible to an operating system that the processor circuit is about to pass control to in order to boot (e.g., the operating system 147).

At 2340, while executing the operation system (possibly its loader) the processor circuit loads device drivers in an order that follows the order of the device blocks in the device table for corresponding hardware devices (e.g., the device drivers 149a-h).

Figure 9:
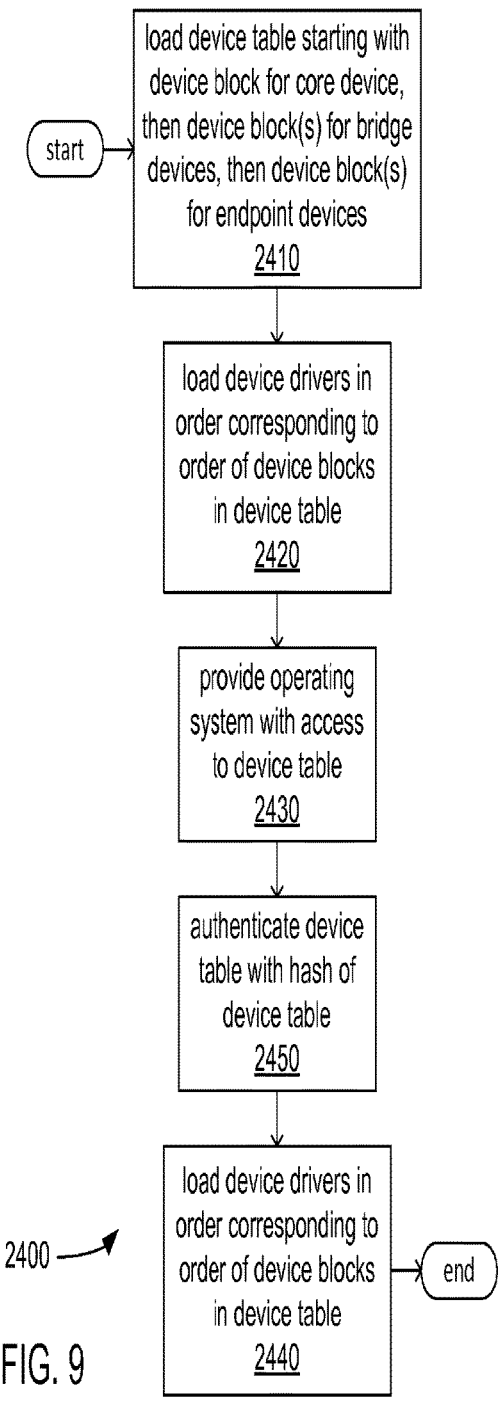
FIG. 9 illustrates an embodiment of a fourth logic flow.

FIG. 9 illustrates an embodiment of a logic flow 2400. The logic flow 2400 may be representative of some or all of the operations executed by one or more embodiments described herein. More specifically, the logic flow 2400 may illustrate operations performed by one or both of the processor circuits 150 and 250 of the computing device 1000 in executing at least the boot routines 140 and 240, respectively.

At 2410, the processor circuit of a computing device (e.g., the processor circuit 150 of the computing device 100) is provided a device table (e.g., the device table 130) by a controller (e.g., the controller 200) and loads its, the device table comprising device blocks arranged in an order within the device table that starts with a device block for a core device, followed by device blocks for bridges devices in an order of decreasing closeness of coupling to the processor circuit, and then followed by device blocks for endpoint devices.

At 2420, while executing a boot routine (e.g., the boot routine 140), the processor circuit loads device drivers in an order that follows the order of the device blocks in the device table for corresponding hardware devices (e.g., the device drivers 142a-h).

At 2430, the processor circuit makes the device table accessible to an operating system that the processor circuit is about to pass control to in order to boot (e.g., the operating system 147).

At 2440, the processor circuit signals the controller to authenticate the device table using a hash of the device table maintained by the controller.

At 2450, while executing the operation system (possibly its loader) the processor circuit loads device drivers in an order that follows the order of the device blocks in the device table for corresponding hardware devices (e.g., the device drivers 149a-h).

Figure 10:
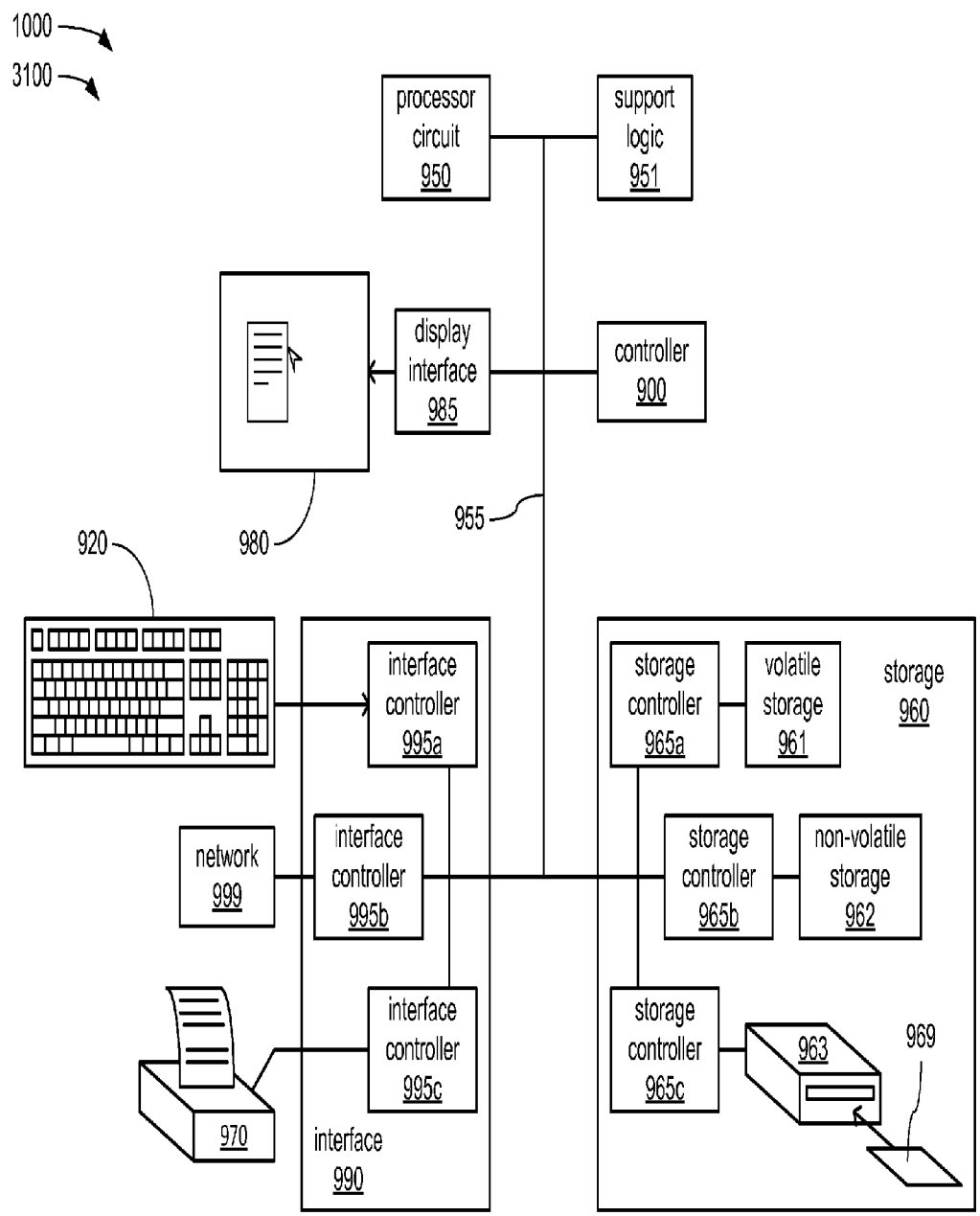
FIG. 10 illustrates an embodiment of a processing architecture.

FIG. 10 illustrates an embodiment of an exemplary processing architecture 3100 suitable for implementing various embodiments as previously described. More specifically, the processing architecture 3100 (or variants thereof) may be implemented as part of one or more of the computing devices 1000 and 400, and/or within the controller 200. It should be noted that components of the processing architecture 3100 are given reference numbers in which the last two digits correspond to the last two digits of reference numbers of components earlier depicted and described as part of each of the computing device 1000 and the controller 200. This is done as an aid to correlating such components of whichever ones of the computing device 1000 and the controller 200 may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3100, a computing device comprises at least a processor circuit 950, a storage 960, a controller 900, an interface 990 to other devices, and coupling 955. As will be explained, depending on various aspects of a computing device implementing the processing architecture 3100, including its intended use and/or conditions of use, such a computing device may further comprise additional components, such as without limitation, a display interface 985.

The controller 900 corresponds to the controller 200. As previously discussed, the controller 200 may implement the processing architecture 3100. Thus, in essence, the controller 200 could be regarded, at least to some extent, as a computing device embedded within the computing device 1000. As such, the controller 200 may perform various functions, including those that have been described at length herein, in support of the computing device 1000 performing various functions.

Coupling 955 is comprised of one or more buses, point-to-point interconnects, transceivers, buffers, crosspoint switches, and/or other conductors and/or logic that communicatively couples at least the processor circuit 950 to the storage 960. Coupling 955 may further couple the processor circuit 950 to one or more of the interface 990 and the display interface 985 (depending on which of these and/or other components are also present). With the processor circuit 950 being so coupled by couplings 955, the processor circuit 950 is able to perform the various ones of the tasks described at length, above, for whichever ones of the computing device 1000 and the controller 200 implement the processing architecture 3100. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150 and 250) may comprise any of a wide variety of commercially available processors, employing any of a wide variety of technologies and implemented with one or more cores physically combined in any of a number of ways.

As previously discussed, the storage 960 (corresponding to one or more of the storages 160 and 260) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of machine-readable storage medium 969 (possibly corresponding to the storage medium 169), the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor circuit 950 as that routine is executed.

As previously discussed, the interface 990 (possibly corresponding to the interface 190) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 970) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920 (possibly corresponding to the controls 120). The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 970. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980, corresponding to the display 180), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing device 1000 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus comprises a first processor circuit and a first storage communicatively coupled to the first processor circuit and arranged to store a first sequence of instructions. The first sequence of instructions are operative on the first processor circuit to create a device table comprising multiple device blocks, each device block corresponding to one of multiple hardware devices accessible to the first processor circuit, the device blocks arranged in an order within the device table indicative of relative positions of the hardware devices in a hierarchy of buses and at least one bridge device of the multiple hardware devices; enable access to the device table by an operating system; and execute a second sequence of instructions of the operating system operative on the processor circuit to access the device table.

The above example of an apparatus in which the first sequence of instructions is operative on the first processor circuit to detect multiple bridge devices among the multiple hardware devices; and arrange device blocks of the multiple device blocks corresponding to bridge devices of the multiple bridge devices in the device table in order of decreasing closeness of coupling of each corresponding bridge device to the first processor circuit.

Either of the above examples of an apparatus in which the first sequence of instructions is operative on the first processor circuit to arrange the device blocks of the multiple device blocks within the device table such that a device block corresponding to a core device of the multiple hardware devices precedes all other device blocks.

Any of the above examples of an apparatus in which the first sequence of instructions is operative on the first processor circuit to detect the at least one bridge device; detect at least one endpoint device among the multiple hardware devices; and arrange device blocks of the multiple device blocks corresponding to the at least one bridge device and the at least one endpoint device within the device table such that all device blocks corresponding to the at least one bridge device precede all device blocks corresponding to the at least one endpoint device.

Any of the above examples of an apparatus in which the at least one endpoint device comprises one of controls, a storage device, an interface controller operative to communicatively couple the first processor circuit to a network, and a display interface.

Any of the above examples of an apparatus comprises a second processor circuit; and a second storage communicatively coupled to the second processor circuit and arranged to store a third sequence of instructions. The third sequence of instructions is operative on the second processor circuit to access the first storage; read the first sequence of instructions; and authenticate the first sequence of instructions.

Any of the above examples of an apparatus in which the first sequence of instructions is operative on the first processor circuit to load multiple device drivers, each device driver of the multiple device drivers corresponding to a device block of the multiple device blocks, in an order corresponding to the order in which the device blocks are arranged within the device table.

Any of the above examples of an apparatus in which each device block of the multiple device blocks comprises data and/or executable code; and each device block specifies an aspect of interaction between a device driver of the multiple device drivers and a hardware device of the multiple hardware devices, the aspect of interaction comprising at least one of parameters passed, a result code returned, an available initialization routine, an available reset routine, a power state control routine, a type of I/O access, a type of memory access, a mechanism to determine a physical address, a mechanism to determine a virtual address, and an error condition.

Any of the above examples of an apparatus in which the second sequence of instructions is operative on the first processor circuit to load multiple device drivers, each device driver of the multiple device drivers corresponding to a device block of the multiple device blocks, in an order corresponding to the order in which the device blocks are arranged within the device table.

An example of another apparatus comprises a first processor circuit and a first storage communicatively coupled to the first processor circuit and arranged to store a first sequence of instructions. The first sequence of instructions is operative on the first processor circuit to enable access by an operating system to a device table comprising multiple device blocks, each device block corresponding to one of multiple hardware devices accessible to the first processor circuit, the device blocks arranged in an order within the device table indicative of relative positions of the hardware devices in a hierarchy of buses and at least one bridge device of the multiple hardware devices; and execute the second sequence of instructions, the second sequence of instructions operable to access the device table.

The above example of another apparatus comprises a second processor circuit; and a second storage communicatively coupled to the second processor circuit and arranged to store a third sequence of instructions. The third sequence of instructions is operative on the second processor circuit to access the first storage; read the first sequence of instructions; and authenticate the first sequence of instructions.

Either of the above examples of another apparatus comprises a second processor circuit; and a second storage communicatively coupled to the second processor circuit and arranged to store the device table and a third sequence of instructions operative on the second processor circuit to copy the device table from the second storage to the first storage.

Alternatively, either of the above examples of another apparatus comprises a second processor circuit; and a second storage communicatively coupled to the second processor circuit and arranged to store a hash of the device table and a third sequence of instructions operative on the second processor circuit to await a signal requesting authentication of the device table with the hash of the device table, the second sequence of instructions operative on the first processor circuit to provide the signal to the second processor circuit.

Any of the above examples of another apparatus in which the first sequence of instructions is operative on the first processor circuit to load multiple device drivers, each device driver of the multiple device drivers corresponding to a device block of the multiple device blocks, in an order corresponding to the order in which the device blocks are arranged within the device table.

Any of the above examples of another apparatus in which the second sequence of instructions is operative on the first processor circuit to load multiple device drivers, each device driver of the multiple device drivers corresponding to a device block of the multiple device blocks, in an order corresponding to the order in which the device blocks are arranged within the device table.

Any of the above examples of another apparatus in which each device block of the multiple device blocks comprises data and/or executable code; and each device block specifies an aspect of interaction between a device driver of the multiple device drivers and a hardware device of the multiple hardware devices, the aspect of interaction comprising at least one of parameters passed, a result code returned, an available initialization routine, an available reset routine, a power state control routine, a type of I/O access, a type of memory access, a mechanism to determine a physical address, a mechanism to determine a virtual address, and an error condition.

An example of a computer-implemented method comprises creating a device table comprising multiple device blocks, each device block corresponding to one of multiple hardware devices of a computing device accessible to a first processor circuit of the computing device, the device blocks arranged in an order within the device table indicative of relative positions of the hardware devices in a hierarchy of buses and at least one bridge device of the multiple hardware devices; enabling access to the device table by an operating system; loading the operating system; and accessing the device table following loading the operating system.

The above example of a computer-implemented method comprises authenticating a boot routine stored in a first storage of the computing device accessible to the first processor circuit, the boot routine comprising a sequence of instructions operative on the first processor circuit to create the device table.

Either of the above examples of a computer-implemented method comprises detecting multiple bridge devices among the multiple hardware devices; and arranging device blocks of the multiple device blocks corresponding to bridge devices of the multiple bridge devices in the device table in order of decreasing closeness of coupling of each corresponding bridge device to the first processor circuit.

Any of the above examples of a computer-implemented method comprises arranging the device blocks of the multiple device blocks within the device table such that a device block corresponding to a core device of the multiple hardware devices precedes all other device blocks.

Any of the above examples of a computer-implemented method comprises detecting the at least one bridge device; detecting at least one endpoint device among the multiple hardware devices; and arranging device blocks of the multiple device blocks corresponding to the at least one bridge device and the at least one endpoint device within the device table such that all device blocks corresponding to the at least one bridge device precede all device blocks corresponding to the at least one endpoint device.

Any of the above examples of a computer-implemented method in which the at least one endpoint device comprising one of controls, a storage device, an interface controller operative to communicatively couple the computing device to a network, and a display interface.

Any of the above examples of a computer-implemented method comprises loading multiple device drivers, each device driver of the multiple device drivers corresponding to a device block of the multiple device blocks, in an order corresponding to the order in which the device blocks are arranged within the device table.

Any of the above examples of a computer-implemented method comprises signaling a second processor circuit to request authentication of the device table using a hash of the device table stored in a storage communicatively coupled to the second processor circuit following loading the operating system.

An example of at least one machine-readable storage medium comprises a first sequence of instructions that when executed by a computing device, causes the computing device to create a device table comprising multiple device blocks, each device block corresponding to one of multiple hardware devices of the computing device accessible to the first processor circuit of the computing device, the device blocks arranged in an order within the device table indicative of relative positions of the hardware devices in a hierarchy of buses and at least one bridge device of the multiple hardware devices; enable access to the device table by an operating system; and execute a second sequence of instructions of the operating system that cause the computing device to access the device table.

The above example of at least one machine-readable storage medium in which the computing device is caused to detect multiple bridge devices among the multiple hardware devices; and arrange device blocks of the multiple device blocks corresponding to bridge devices of the multiple bridge devices in the device table in order of decreasing closeness of coupling of each corresponding bridge device to the first processor circuit.

Either of the above examples of at least one machine-readable storage medium in which the computing device is caused to arrange the device blocks of the multiple device blocks within the device table such that a device block corresponding to a core device of the multiple hardware devices precedes all other device blocks.

Any of the above examples of at least one machine-readable storage medium in which the computing device is caused to detect the at least one bridge device; detect at least one endpoint device among the multiple hardware devices; and arrange device blocks of the multiple device blocks corresponding to the at least one bridge device and the at least one endpoint device within the device table such that all device blocks corresponding to the at least one bridge device precede all device blocks corresponding to the at least one endpoint device.

Any of the above examples of at least one machine-readable storage medium in which the at least one endpoint device comprising one of controls, a storage device, an interface controller operative to communicatively couple the computing device to a network, and a display interface.

Any of the above examples of at least one machine-readable storage medium in which the computing device is caused to load multiple device drivers, each device driver of the multiple device drivers corresponding to a device block of the multiple device blocks, in an order corresponding to the order in which the device blocks are arranged within the device table.

The invention claimed is:

1. An apparatus comprising:
   a processor; and
   logic, at least partially implemented by the processor, the logic to:
      generate a device table comprising a plurality of device blocks, each device block corresponding to one of multiple devices, the device blocks arranged in a hierarchal order within the device table to indicate relative positions of the devices such that a device block corresponding to a core device of the multiple devices precedes all other device blocks; and
      load multiple device drivers for the multiple devices in an order that follows the order of the device blocks.

2. The apparatus of claim 1, the hierarchal order to indicate relative positions of the devices in hierarchy of buses and at least one bridge device of the multiple devices.

3. The apparatus of claim 1, the logic to:
   detect multiple bridge devices among the multiple devices; and
   arrange device blocks of the plurality of device blocks corresponding to bridge devices of the multiple bridge devices in the device table in order of decreasing closeness of coupling of each corresponding bridge device to the processor.

4. The apparatus of claim 1, the logic to:
   detect at least one bridge device and at least one endpoint device among the multiple devices; and arrange device blocks of the multiple device blocks corresponding to the at least one bridge device and the at least one endpoint device within the device table such that all device blocks corresponding to the at least one bridge device precede all device blocks corresponding to the at least one endpoint device.

5. The apparatus of claim 1, each device driver of the multiple device drivers corresponding to a device block of the multiple device blocks.

6. The apparatus of claim 1, the hierarchal order of the plurality of device blocks comprising all device blocks corresponding with core devices preceding all device blocks corresponding with bridge devices further preceding all device blocks corresponding with endpoint devices.

7. The apparatus of claim 1, comprising:
storage to store a hash of the device table; and
the logic to authenticate the device table using the hash of the device table of the device.

8. The apparatus of claim 1, the core device comprising one of a system timer, an interrupt controller, a direct memory access (DMA) controller, a real-time clock, and a cache controller.

9. A computer-implemented method comprising:
generating a device table comprising a plurality of device blocks, each device block corresponding to one of multiple devices, the device blocks arranged in a hierarchal order within the device table to indicate relative positions of the devices such that a device block corresponding to a core device of the multiple devices precedes all other device blocks; and
loading multiple device drivers for the multiple devices in an order that follows the order of the device blocks.

10. The computer-implemented method of claim 9, the hierarchal order to indicate relative positions of the devices in hierarchy of buses and at least one bridge device of the multiple devices.

11. The computer-implemented method of claim 9, comprising:
detecting multiple bridge devices among the multiple devices; and
arranging device blocks of the plurality of device blocks corresponding to bridge devices of the multiple bridge devices in the device table in order of decreasing closeness of coupling of each corresponding bridge device to the core device.

12. The computer-implemented method of claim 9, comprising:
detecting at least one bridge device and at least one endpoint device among the multiple devices; and
arranging device blocks of the multiple device blocks corresponding to the at least one bridge device and the at least one endpoint device within the device table such that all device blocks corresponding to the at least one bridge device precede all device blocks corresponding to the at least one endpoint device.

13. The computer-implemented method of claim 9, each device driver of the multiple device drivers corresponding to a device block of the multiple device blocks.

14. The computer-implemented method of claim 9, the hierarchal order of the plurality of device blocks comprising all device blocks corresponding with core devices preceding all device blocks corresponding with bridge devices further preceding all device blocks corresponding with endpoint devices.

15. The computer-implemented method of claim 9, comprising
retrieving a hash of the device table from memory; and
authenticating the device table using the hash of the device table of the device.

16. The computer-implemented method of claim 9, the core device comprising one of a system timer, an interrupt controller, a direct memory access (DMA) controller, a real-time clock, and a cache controller.

17. At least one machine-readable storage medium comprising a first sequence of instructions that when executed by a computing device, causes the computing device to:
generate a device table comprising a plurality of device blocks, each device block corresponding to one of multiple devices, the device blocks arranged in a hierarchal order within the device table to indicate relative positions of the devices such that a device block corresponding to a core device of the multiple devices precedes all other device blocks; and
load multiple device drivers for the multiple devices in an order that follows the order of the device blocks.

18. The at least one machine-readable storage medium of claim 17, the hierarchal order to indicate relative positions of the devices in hierarchy of buses and at least one bridge device of the multiple devices.

19. The at least one machine-readable storage medium of claim 17, the computing device caused to:
detect multiple bridge devices among the multiple devices; and
arrange device blocks of the plurality of device blocks corresponding to bridge devices of the multiple bridge devices in the device table in order of decreasing closeness of coupling of each corresponding bridge device to the core device.

20. The at least one machine-readable storage medium of claim 17, the computing device caused to:
detect at least one bridge device and at least one endpoint device among the multiple devices; and
arrange device blocks of the multiple device blocks corresponding to the at least one bridge device and the at least one endpoint device within the device table such that all device blocks corresponding to the at least one bridge device precede all device blocks corresponding to the at least one endpoint device.

21. The at least one machine-readable storage medium of claim 17, each device driver of the multiple device drivers corresponding to a device block of the multiple device blocks.

22. The at least one machine-readable storage medium of claim 17, the hierarchal order of the plurality of device blocks comprising all device blocks corresponding with core devices preceding all device blocks corresponding with bridge devices further preceding all device blocks corresponding with endpoint devices.

23. The at least one machine-readable storage medium of claim 17, the computing device caused to:
retrieve a hash of the device table from memory; and
authenticate the device table using the hash of the device table of the device.

24. The at least one machine-readable storage medium of claim 17, the core device comprising one of a system timer, an interrupt controller, a direct memory access (DMA) controller, a real-time clock, and a cache controller.

* * * * *